(12) United States Patent
Priebe

(10) Patent No.: US 6,217,077 B1
(45) Date of Patent: Apr. 17, 2001

(54) SCORING SYSTEM FOR HORNED AND ANTLERED GAME ANIMALS

(76) Inventor: Michael E. Priebe, 5409 Edinburgh Dr., Waco, TX (US) 76710

( * ) Notice: Subject to any disclaimer, the term of this patent is extended or adjusted under 35 U.S.C. 154(b) by 0 days.

(21) Appl. No.: 09/561,303

(22) Filed: Apr. 28, 2000

(51) Int. Cl.[7] .............................. G01B 1/00; G01B 5/00; B43L 7/00
(52) U.S. Cl. ......................... 283/49; 283/102; 283/107; 283/109; 283/115; 283/117; 281/38; 281/39; 281/51; 33/485; 33/494; 33/511; 33/549; 33/553; 33/561.1; 33/561.2; 33/679.1; 33/712; 33/755; 33/756; 33/759; 33/783; 43/1; 43/4; 43/5
(58) Field of Search ..................... 283/102, 107, 283/109, 115, 117, 49; 281/38, 39, 51; 33/485, 494, 511, 549, 553, 561.1, 561.2, 679.1, 712, 755, 756, 759, 783; 43/1, 4, 5; 434/430, 408, 413, 418

(56) References Cited

U.S. PATENT DOCUMENTS

| | | | |
|---|---|---|---|
| 296,504 | * 4/1884 | Atkins .................................. | 33/511 |
| D. 342,687 | * 12/1993 | Kang ..................................... | D10/72 |
| 2,756,507 | * 7/1956 | Martin et al. .......................... | 33/511 |
| 5,265,605 | * 11/1993 | Afflerbach ............................ | 128/630 |
| 5,970,620 | * 10/1999 | Campbell .............................. | 33/485 |

* cited by examiner

Primary Examiner—A. L. Wellington
Assistant Examiner—Mark T. Henderson
(74) Attorney, Agent, or Firm—David G. Henry

(57) ABSTRACT

The invention is of a kit or system useful for guiding and facilitating the taking, tabulation and processing of measurements as pertain to scoring game animal according to established scoring rules. The kit or system includes a flexible cable which is used to record absolute lengths or distances needed for a proper scoring. The cable lacks cumulative length indicia or unit indications, but rather includes equally spaced incremental indicia which are used (by multiplying the number of indicia as rest between measurement endpoints) as part of the ultimate determination of length according to standard measurement units. A reusable score card is also provided which includes spaces for recording measurements and indicia for indicating the proper measurements to be taken as well as the sequence thereof and prescribed calculations to be made therefrom.

4 Claims, 3 Drawing Sheets

SCORING SYSTEM FOR HORNED AND ANTLERED GAME ANIMALS

BACKGROUND OF THE INVENTION

1. Field of the Invention

The present invention relates to measurement devices and systems, and more particularly to such devices and systems as pertain to the determination of scores for game animals according to establish scoring for game animals.

2. Background Information

As with any sport's aficionados, avid hunters tend to compete against others and against themselves using a scoring system as the proverbial yardstick.

In the case of scoring systems used to rate horned or antlered game animals, there is a correspondence between the score which is assigned to a particular animal and such things as the distance of the "inside spread" (the widest point between inside surfaces of the animal's "main beams"); the length of each "main beam" (the primary antler or horn projection from which all "points" or other sub-components of the "rack" extend); the length of each point; and the circumference of the main beam.

There exist at least two primary scoring systems for most horned and antlered game animals, but each system relies on measuring substantially the same features of a game animal's rack.

Present practices in the scoring of game animals are somewhat needlessly cumbersome. Typically, a person who scores a game animal will use a flexible tape measure, masking tape for attaching the tape measure to points of measurement origin, and a scratch pad for recording the various measurements. Also, the use of a tape measure (with its cumulative total gradations being clearly visible during use) to make the actual measurement, especially if done by the hunter himself, injects a certain temptation to skew the numbers in a positive direction if the particular measurement is "just short" of a desired objective.

It would well serve recreational hunters to provide a scoring system for use in scoring game animals, which system would be based upon the use of standardized measuring devices, easy to follow scoring guides with sequential steps for scoring, and simple to use measurement recording markers which obviate the need for such steps as marking on a tape measure, or using tape to mark the length on a tape measure, as well as having to fumble around with a pen or pencil.

SUMMARY OF THE INVENTION

It is an object of the present invention to provide an improved game animal scoring system for facilitating the orderly measurement and recordation of lengths and dimensions as pertain to scoring a game animal according to established rules.

It is another object of the present invention to provide an improved game animal scoring system which, by lacking cumulative length indicia on the primary measuring device, both simplifies initial length determination and lessens temptation for users to initially exaggerate measurements.

In satisfaction of these and related objects as will be clear from the balance of this text, the present invention provides an improved and simplified game animal scoring system. The system includes a flexible, cable member which is used to initially establish absolute length or (as applicable) distance between two points on a structure, or between two structures. The cable member lacks cumulative length indicia, but includes incremental indicia which are ultimately used (knowing the distance between each indicia) to arrive at a distance as expressed in established units (inches, for example). The system includes an alligator clip or similar, mechanically removable marker member for mechanically, but removably marking an endpoint of any given measurement. A ruler-like device (also included) is used to determine the length (by established units) between the far-most indicia from the origination end of the cable member to the point on the cable member as corresponds to the endpoint of the taken measurement.

As measurements are taken, they are recorded on reusable score card which includes spaces for recording measurements and indicia for indicating the proper measurements to be taken as well as the sequence thereof and prescribed calculations to be made therefrom.

DETAILED DESCRIPTION OF THE PREFERRED EMBODIMENT

Figure 1:
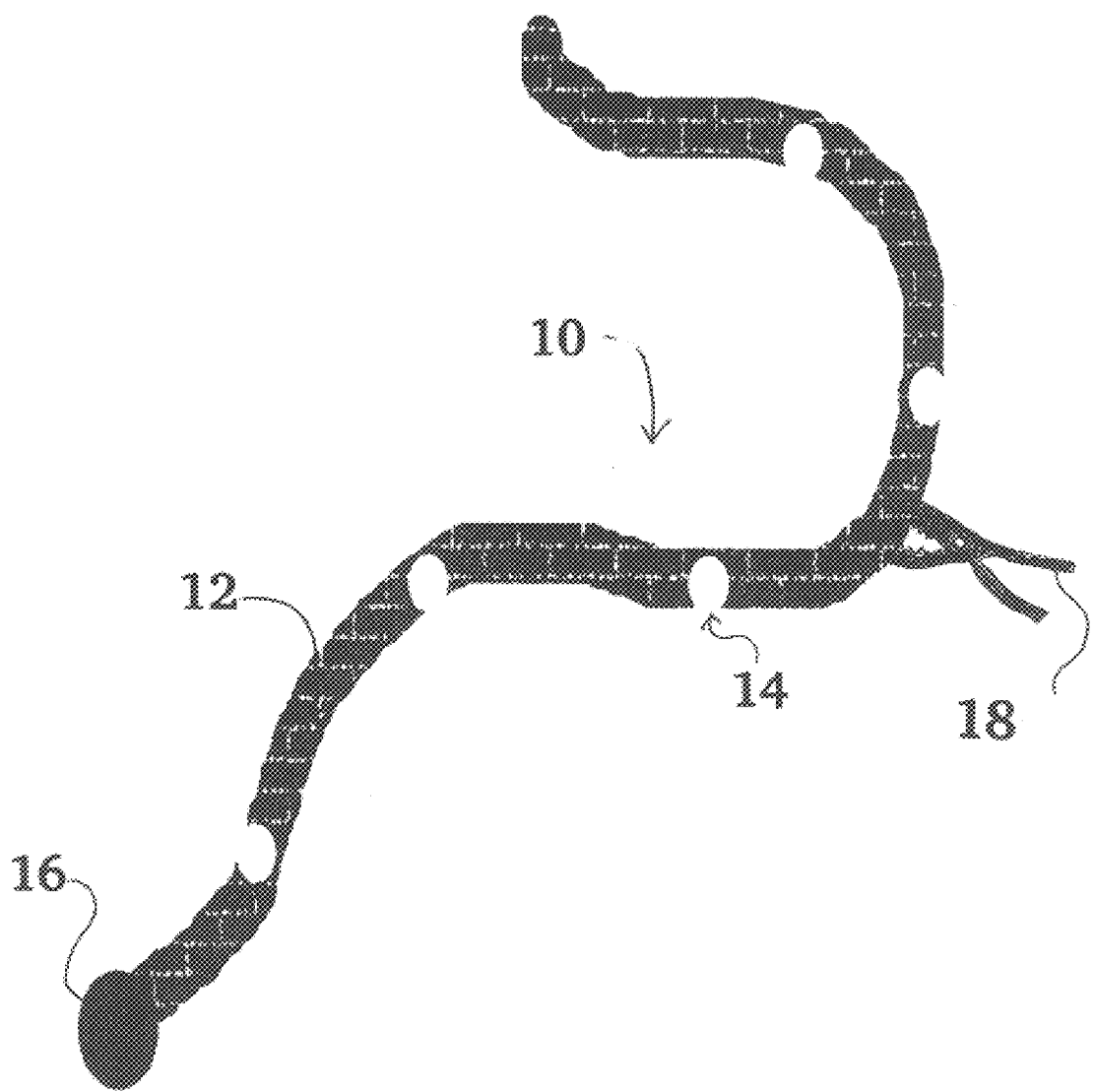
FIG. 1 is a perspective view of the cable member 10 of the preferred embodiment of the present game animal scoring system.

Referring to FIG. 1, the improved scoring system for game animals provided by the present invention is based on the use of a slender cable 10 (an approximately ⅛ th inch steel cable in the preferred embodiment—NOT DEPICTED TO SCALE). Cable 10 is, in the preferred embodiment, 45 inches long and encased in a flexible plastic coating 12. At 5 inch intervals, visible length gradations 14 (preferably without cumulative, literal measurement indicia) are printed on the plastic coating 12.

In some embodiments of the present invention, cable 10 may include sequential measurement indicia (1, 2, 3 . . . , and so on) which are printed on the plastic coating 12, but which do not indicate the literal cumulative measurement and inches, for reasons stated above in the background section.

At a first end of cable 10 is provided a cable hold 16 by which the user may securely grasp and immobilize the first cable end at the point of origin for a measurement step.

Also provided with the scoring system of the present invention are one or more "alligator clips 18." Alligator clips 18 are very well suited for use in "marking" the termination point of a measurement while using cable 10, because such clips easily clip onto such a round, slender form. Alligator clips 18 are simply clipped onto cable 10 at the termination point of any given measurement. Users of typical dexterity can easily accomplish this "marking" step without letting go of cable 10 such as would be necessary while using a pencil or piece of tape to "mark" such a point on a tape measure, etc. Furthermore, using such a method for "marking" measurement termination points are instantly "erasable" and prevent confusion in later measurement steps such as might occur when using pencil or tape marks when a mark from an earlier measurement might be mistakenly recorded as the termination point for a later measurement. Once an alligator clips 18 is removed from cable 10, cable 10 is as if it had not yet been used.

Figure 2:
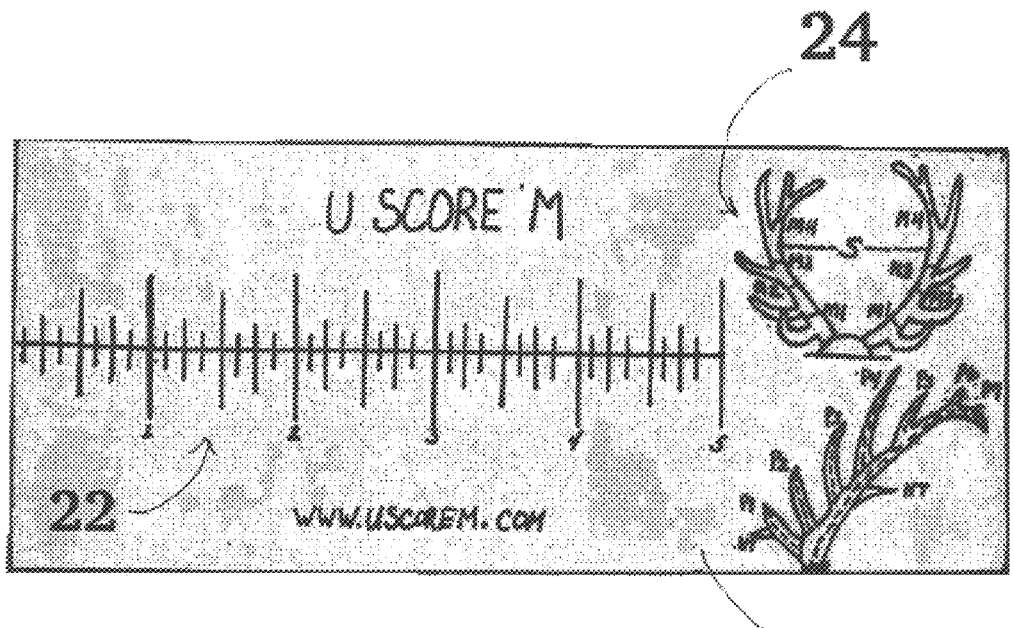
FIG. 2 is an elevation view of a first side of the scoring card 20 of the system of the present invention.
Figure 3:
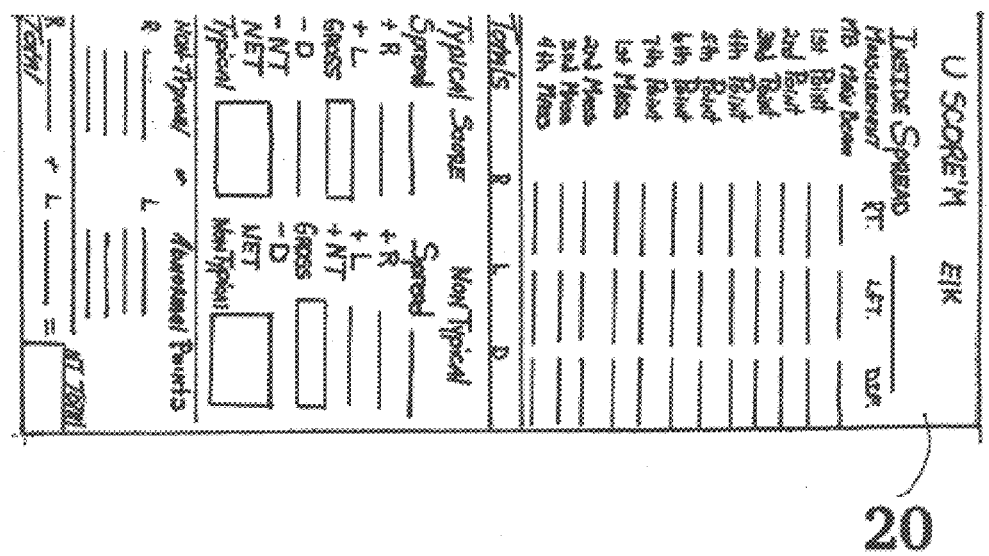
FIG. 3 is an elevation view of a second side of the scoring card 20 of the system of the present invention.

Referring to FIGS. 2 and 3, a scoring card 20 is provided to guide a user of the present scoring system, step-by-step, in gathering the needed scoring measurements and tabulating them once they are obtained. Scoring card 20, in the preferred embodiment, is the plastic-coated card on which dry-erase markers may be used (the purpose of the plastic coating on card 20 being to facilitate the use of such a marker to thereby enable repeated use of scoring card 20 as well as to give card 20 a virtually unlimited service life).

Referring principally to FIG. 2, on one side of card 20 is printed a ruler 22 which is used to measure the last increment of length as measured with cable 10 beyond the last indicia 14 to arrive at a total length of a given measurement (the total number of indicia 14 spanned by the measured feature times 5 inches, plus the length in inches beyond the last indicia 14 as revealed through use of ruler 22). The preferred embodiment also includes on this same side diagrams 24 (specific to the species for which each embodiment of the system is configured) to indicate where the scoring measurements are to be made, and the corresponding abbreviation in which each respective measurement will be entered on the reverse side of card 20.

Referring principally to FIG. 3, the second side of card 20 includes titles, abbreviations and blanks on which individual measurements and tabulations are written (using the dry-erase marker). Following the clear path of listings and calculations, and with a basic knowledge of scoring system which is to be employed, one can easily arrive at a score for any given animal through use of the present system.

Figure 4:
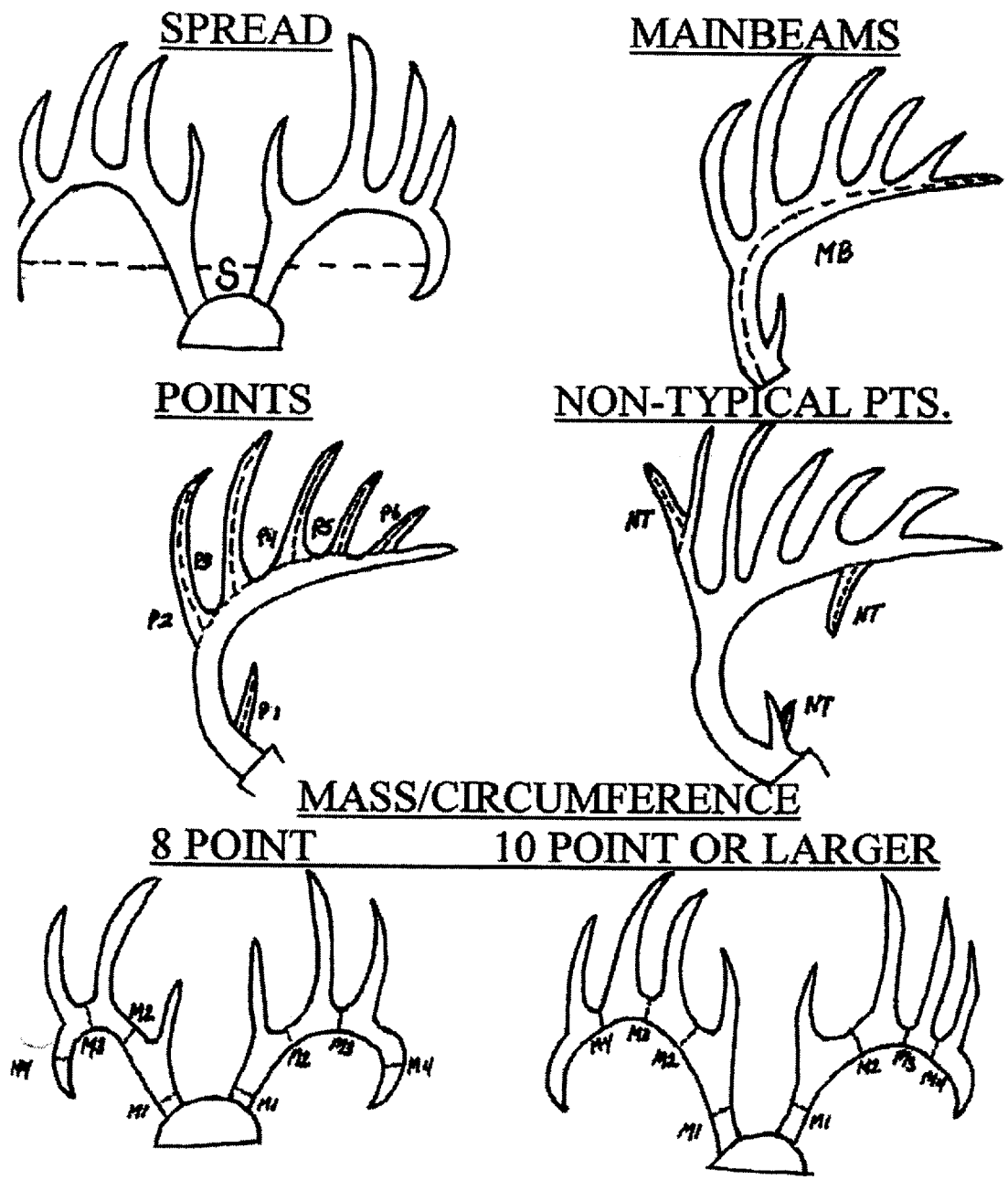
FIG. 4 is a depiction of instructions useful in employing the present game animal scoring system.

Referring to FIG. 4, instructions for using the present system will be included in any commercial embodiment. Such instructions, which will also include textual, step-by-step instructions, will include diagrams such as are shown in FIG. 4, which diagrams are specific to the species for which each system is configured.

Using the present system is straight forward. One first determines (with reference to score card 20) what structure will be measured, and between what points is the measurement to be taken. The user then selects cable 10 and places cable hold 16 at the starting measurement point (such as at the base of a main beam), then working gradually along the length of the object to be measured, conforms cable 10 to the contours of the object sliding the fingers along cable 10 in such a manner as the length of the object may be indicated by a corresponding point on cable 10. Upon reaching the point on cable 10 which corresponds to the end measurement point, the user places an alligator clip 18 on that point.

The user next simply counts the number of gradation indicia 14 as lie between the first origination end of cable 10 (with the cable hold 16) and the position of the alligator clip 18, and multiplies this number by the span between each indicia 14 (5 inches in the preferred embodiment). To this total is added the length (as measured using ruler 22) between the last indicia 14 and the alligator clip to arrive at the final measurement.

The user next records the measurement on the corresponding blank (data entry space) on score card 20, and starts the process over for each measurement to be made. Once all measurements are made, the actual score is calculated according to the rules provided in the accompanying instructions, or (if applicable) according to the user's own system or memory of established scoring rules.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An improved game animal scoring system comprising:

an elongate, flexible member having a first, origination end and a second termination end, said elongate, flexible member further having equally spaced gradation indicia applied thereto, said elongate, flexible member being substantially circular in cross section and being of a length of not less than approximately 20 inches;

ruler means; and mechanically removable marker means for reversibly indicating a position on said elongate, flexible member as corresponds to a length along said elongate, flexible member as measured from said first, origination end to said position;

record keeping means for recording each of a plurality of measurements of a game animal as prescribed by a scoring system, said record keeping means displaying indicia as identifies each of said measurements and data entry space for entering corresponding data for each of said measurements, said record keeping means further having data entry space for entering tabulated data as derived from said measurements according to said scoring system.

2. The game animal scoring system of claim 1 wherein said elongate, flexible member is a metallic cable of approximately 1/8 inch in diameter, and wherein said metallic cable is plastic coated.

3. The game animal scoring system of claim 1 wherein said record keeping means is a plastic coated card member, a surface of which reversibly markable with dry erase marker means.

4. The game animal scoring system of claim 1 wherein said elongate, flexible member has affixed to its said first, origination end a cable hold member for facilitating grasping and immobilization of said elongate, flexible member during use thereof in performing a measurement.

* * * * *